UNITED STATES PATENT OFFICE.

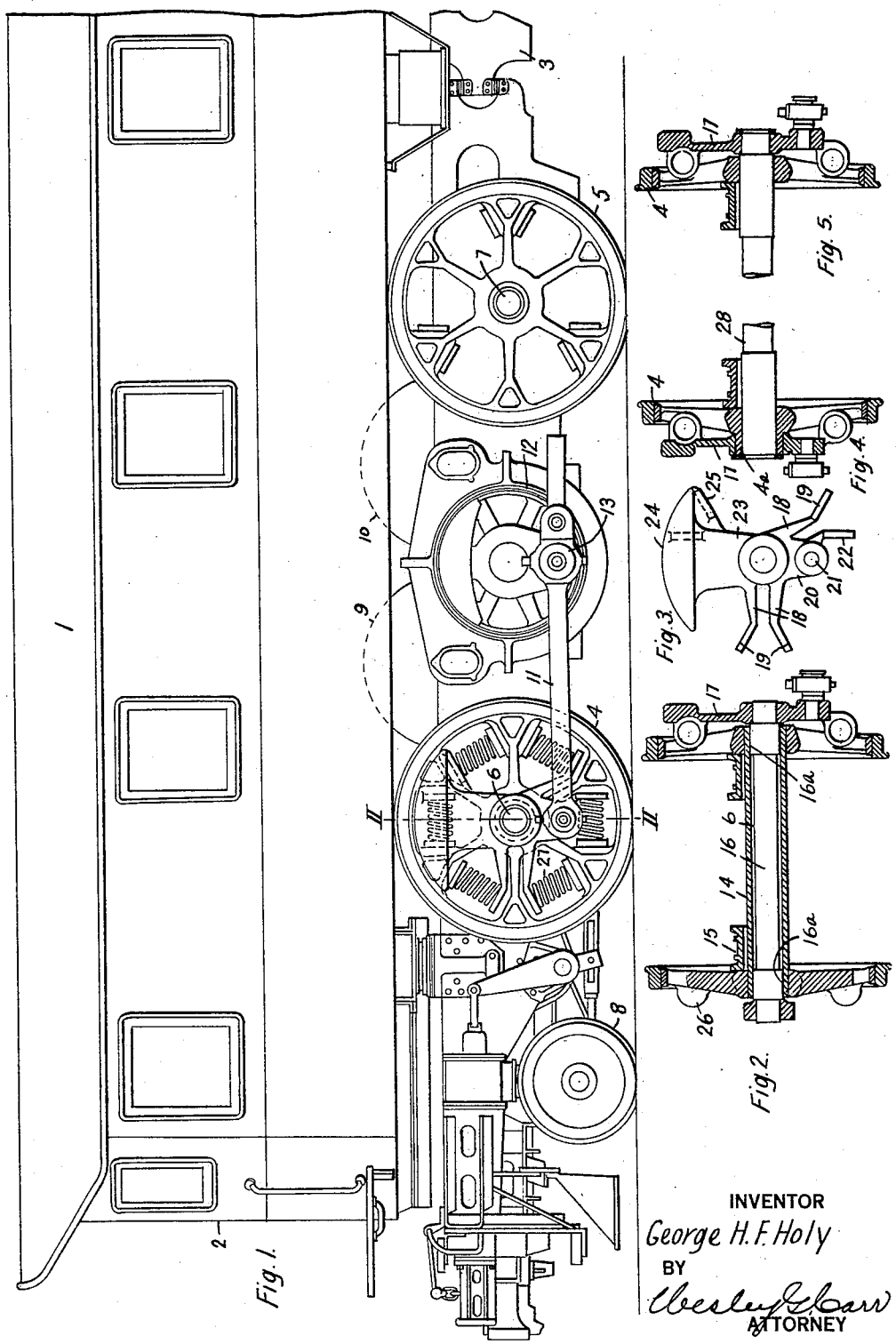

GEORGE H. F. HOLY, OF PITTSBURGH, PENNSYLVANIA, ASSIGNOR TO WESTINGHOUSE ELECTRIC AND MANUFACTURING COMPANY, A CORPORATION OF PENNSYLVANIA.

RESILIENT DRIVING CONNECTION.

1,306,543.     Specification of Letters Patent.     Patented June 10, 1919.

Application filed February 4, 1916. Serial No. 76,164.

*To all whom it may concern:*

Be it known that I, GEORGE H. F. HOLY, a citizen of the United States, and a resident of Pittsburgh, in the county of Allegheny and State of Pennsylvania, have invented a new and useful Improvement in Resilient Driving Connections, of which the following is a specification.

My invention relates to resilient driving connections and has particular relation to the connection between the driving units and the driving wheels of electric locomotives or other railway vehicles.

One object of my invention is to provide a driving connection of the above indicated character that shall be relatively compact, simple to construct, easy to assemble and reliable in operation.

Another object of my invention is to provide a connection between the driving units and the driving wheels which shall include resilient means mounted upon the driving wheels.

When a resilient drive is desired on an electric locomotive, it is customary to insert a resilient connection, as, for example a resilient gear wheel, between the driving motor and the side rod, but, in many cases, it is impossible to insert sufficient resiliency in the driving connection at this point because of the width of the gears and counterweights and the throw of the crank. It may also be impractical to insert a resilient gear in the drive between the motor and the side rod.

However, in a locomotive constructed in accordance with my invention, an individual resilient connection is inserted between each driving wheel and the side rod.

In the accompanying drawing illustrating my invention, Figure 1 is a side elevation of a locomotive constructed in accordance with my invention; Fig. 2 is a section along the line II—II of Fig. 1; Fig. 3 is a detail view of a crank disk, and Figs. 4 and 5 are sectional views of modifications of my invention.

Referring to the drawing, a locomotive 1 is shown embodying a cab 2, a frame 3, pairs of driving rail-engaging or road wheels 4 and 5 mounted upon axles 6 and 7, respectively, and a guiding truck having wheels 8 of a lesser diameter than the diameter of the driving wheels. Driving motors 9 and 10, mounted upon the frame 3, are connected to side rods 11 by means of gear wheels 12 and crank pins 13.

Referring to Fig. 2, the driving axle 6 embodies a quill axle 14 having journal bearings 15 and a crank shaft 16 disposed within the quill axle. Bearing seats 16ª are provided in the quill axle for the crank shaft. Crank disks 17 are mounted on the crank shaft 16 near the ends thereof, and the driving wheels 4 are mounted on the quill axle 14 near the ends thereof.

Each of the crank disks 17 is provided with arms 18 having spring seats 19 thereon, an arm 20 provided with a crank pin 21 and a spring seat 22, and an arm 23 provided with a counterbalance weight 24 and spring seats 25. The spokes of each driving wheel are provided with spring seats 26 which are disposed in the same plane as the spring seats 19, 22 and 25 of the crank disk 17. Springs 27 are disposed between the spring seats 19, 22 and 25 of the crank disks and the spring seats 26 on the driving wheels. The side rods 11 are joined to the crank pins 21.

Referring to Fig. 5, the driving wheels 4 (one only being shown) are rigidly mounted on a solid axle 28 and, adjacent thereto and near the ends of axle 28, the crank disks 17 are rotatably mounted. The crank disks 17 are joined to the driving wheels 4 in a manner similar to that explained in describing Fig. 2.

The modification shown in Fig. 4 is similar to the modification illustrated in Fig. 5 with the exception that, in Fig. 4, the crank disks 17 are rotatably mounted upon hub extensions 4ª of the wheels 4 in place of being rotatably mounted upon the axle 28, as in Fig. 5.

In the modifications illustrated in Figs. 4 and 5, the wheels and crank disks may be prevented from having movement parallel to the axle in any well known manner.

In operating the locomotive, the springs 27 provide a resilient connection between the driving wheels and the propelling units to absorb the shocks exerted on the driving wheels when starting the locomotive or when running over a rough road bed. The quill axle 14, upon which the driving wheels are mounted, should be designed to meet all conditions to which a solid axle would be subjected, except the driving torque.

It is evident that modifications in the specific structural details may be effected without departing from the spirit and scope of my invention, and I desire that only such limitations shall be imposed as are indicated in the appended claims.

I claim as my invention:

1. In a locomotive, the combination with a rail-engaging driving wheel and a crank pin, of means comprising a plurality of helical springs for joining said crank pin to said driving wheel.

2. In a vehicle, the combination with a driving road wheel, a crank disk and a crank pin mounted on said crank disk, of resilient means for joining said crank disk to said driving wheel.

3. In a locomotive, the combination with a driving wheel, a crank disk, and a crank pin and a counter-balance weight mounted on said disk, of resilient means for joining said crank disk to the driving wheel.

4. In a locomotive, the combination with driving motors, side rods, and means for joining the side rods to said motors, of means for resiliently joining the side rods to the driving wheels.

5. In a locomotive, the combination with an axle having two driving road wheels and two crank disks independently mounted thereon, and crank pins mounted on said crank disks, of means for resiliently joining said crank disks to said driving wheels.

6. In a locomotive, the combination with driving motors and driving road wheels, of means for joining said motors to the driving wheels, including springs mounted on said driving wheels for rendering said connecting means resilient.

7. In a locomotive, the combination with a plurality of driving wheels, a plurality of crank pins and driving motors, of means for connecting said crank pins to the driving motors, and means for resiliently connecting the crank pins to the driving wheels.

8. In a locomotive, the combination with a quill driving axle and a pair of driving wheels mounted thereon, a crank axle mounted in said quill axle, crank disks mounted on said crank axle, and crank pins mounted on said crank disks, of resilient means for joining said crank disk to said driving wheels.

9. In a locomotive, the combination with a frame, a quill axle having bearings on said frame, a crank axle disposed within, and having bearings on, said quill axle, driving wheels mounted on said quill axle, and crank disks mounted on said crank axle, of means for resiliently joining said crank disks to said driving wheels.

10. In a locomotive, the combination with a plurality of motors, side rods operated by said motors, a plurality of axles, driving wheels and crank disks independently mounted on said axles, and crank pins mounted on said disks and connected to said side rods, of resilient means for joining said crank disks to said driving wheels.

11. In a vehicle, the combination with a driving road wheel and a crank arm mounted independently of said driving wheel, of means for resiliently joining the crank arm to the driving wheel.

In testimony whereof, I have hereunto subscribed my name this 29th day of Jan., 1916.

GEORGE H. F. HOLY.